Theodore R. Timby.
Water Meter.

No. 122,683.   Patented Jan. 9, 1872.

Witnesses.
Jas. L. Ewin
Walter Allen

Inventor.
T. R. Timby
By Knight Bros.
Attorneys

UNITED STATES PATENT OFFICE.

THEODORE R. TIMBY, OF TARRYTOWN, NEW YORK.

IMPROVEMENT IN WATER-METERS.

Specification forming part of Letters Patent No. 122,683, dated January 9, 1872.

SPECIFICATION.

I, THEODORE R. TIMBY, of Tarrytown, in the county of West Chester and State of New York, have invented a new and useful Improvement in Water-Meters, of which the following is a specification:

Nature and Objects of the Invention.

My invention relates to that class of water-meters in which the quantity of water which passes through the apparatus is determined by the rotation of a spiral wheel or screw, upon which the water acts. My improvement consists of a device by which the current of water is made to act upon the arms or wings of the screw near its periphery, by which means I am enabled to use a screw of much larger diameter, and render the screw more sensitive to the current, so that it will respond to the slightest motion of the water.

Description of the Accompanying Drawing.

Figure 1:
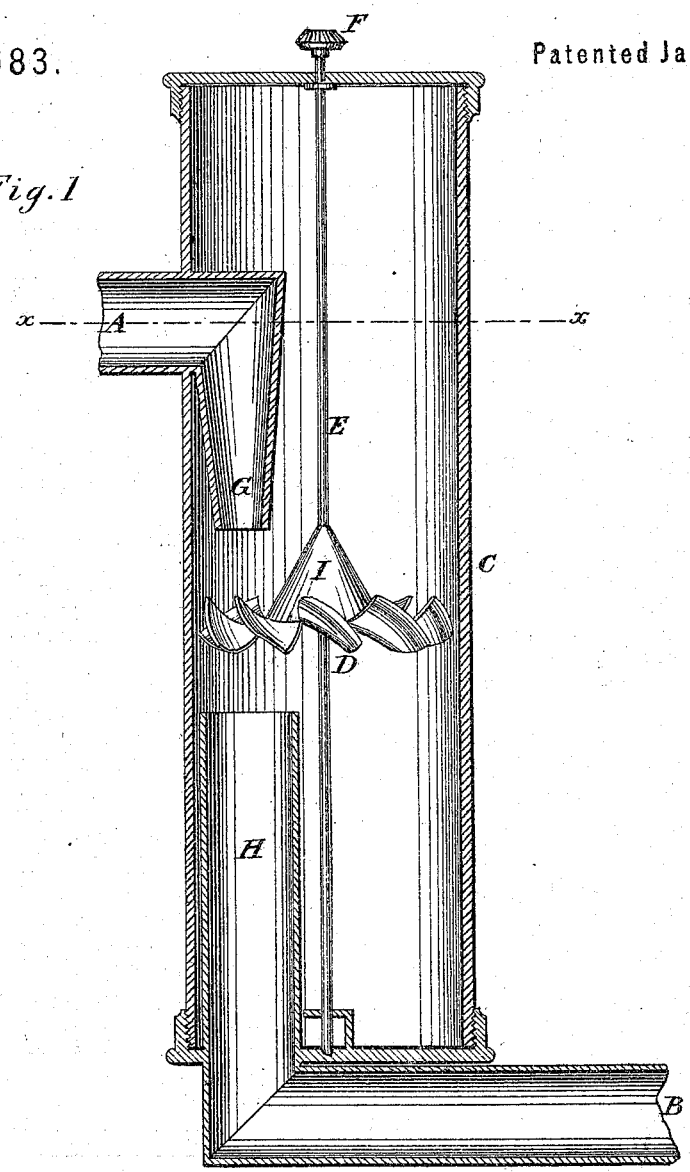
Figure 2:
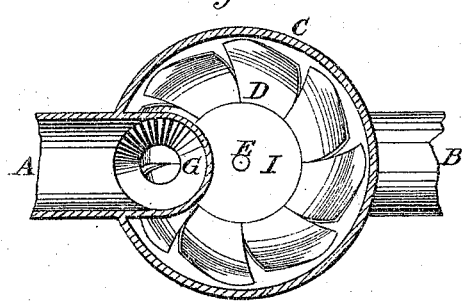

Figure 1 is a vertical longitudinal section of my improved water-meter. Fig. 2 is a horizontal section thereof at x x, Fig. 1.

General Description.

A represents the inlet, and B the outlet, to and from the casing C. D is the spiral wheel or screw, which may be constructed after the manner of a screw propeller. E is the shaft, at the upper end of which is a pinion, F, which is designed to communicate with the pointer or pointers through a train of gearing proportioned so as to impart a reduced motion thereto. G is a nozzle communicating with the inlet A, and so arranged and applied as to deflect the inflowing water downward, and into direct contact with the wheel near the periphery thereof, so that in passing through the said wheel it will impart a regular rotation thereto proportioned to the quantity of water transmitted.

In order more effectually to determine the current to the desired point—that is, near the periphery of the wheel—I employ, under the wheel, and directly in line with the nozzle G, a conductor, H, which communicates with the discharge opening B, so that all the water discharged must pass through the said conductor. Around the shaft E, above the wheel D, I apply a cone, I, to further assist in deflecting the water toward the periphery.

Claims.

I claim as my invention—
1. The combination and arrangement of the induction A G and eduction H B in relation to each other and to the wheel D within the casing C, as and for the purposes set forth.
2. The deflecting cone I, in combination with the casing C, wheel D, inlet A, and outlet B, substantially as set forth.

THEODORE R. TIMBY.

Witnesses:
OCTAVIUS KNIGHT,
WALTER ALLEN. (167)